United States Patent Office 3,340,042
Patented Sept. 5, 1967

3,340,042
POST-EMERGENCE HERBICIDAL MIXTURE
AND METHOD OF USE
Herbert Schwartz, Smaragdplein 186, Utrecht, Netherlands, and Joseph B. Skaptason, 12700 Prospect Ave., Kansas City, Mo. 64146
No Drawing. Filed June 24, 1965, Ser. No. 466,819
26 Claims. (Cl. 71—94)

This application is a continuation-in-part application of copending application Ser. No. 414,865 filed Nov. 30, 1964, now abandoned.

The invention relates to novel post-emergence herbicidal compositions comprised of at least one benzanilide of the formula

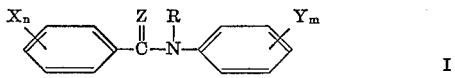

where X is selected from the group consisting of halogen, lower alkyl, lower alkoxy, carbo - lower - alkoxy, amino, cyano, arsono, acetyl and nitro, Y is selected from the group consisting of halogen, cyano, nitro, arsono, carbo-lower-alkoxy and lower alkyl, Z is selected from the group consisting of oxygen and sulfur, R is selected from the group consisting of hydrogen, lower alkyl, and $m$ and $n$ are integers from 0 to 5 in an organic solvent which permits the benzanilide to penetrate the cuticle of the plants. The invention further relates to novel methods of regulating plant growth and of protecting plants from mildew.

The commercial use of herbicides has only recently begun to reach substantial proportions and a great deal of research has been conducted in this field in the last few years. Many compounds, both new and old, have been tested for their pre-emergence and post-emergence herbicidal activity. Pizey et al. (J. Sci. Food Agr. vol. 10, 1959, pp. 577–584) tested a few benzanilides in the normal manner for their pre-emergence herbicidal activity and there was found a lack of herbicidal activity in the seed germination test. Therefore, it was surprising that the benzanilide containing compositions of the invention possess excellent post-emergence herbicidal activity.

It is an object of the invention to provide novel post-emergence plant growth regulating compositions.

It is another object of the invention to provide novel compositions for controlling weeds in cotton fields.

It is another object of the invention to provide a novel method of regulating plant growth.

It is a further object of the invention to provide a novel method for regulating weeds in cotton fields.

It is an additional object of the invention to provide a novel method of protecting plants from mildew attack.

It is a further object of the invention to provide a pre-emergence method of controlling weeds.

These and other objects and advantages of the invention will become obvious from the following detailed description.

The novel post-emergence herbicidal compositions of the invention are comprised of at least one benzanilide of the formula

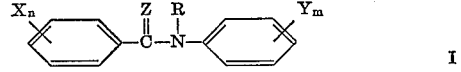

wherein X is selected from the group consisting of halogen, lower alkyl, lower alkoxy, carbo lower alkoxy, amino, cyano, arsono, acetyl and nitro, Y is selected from the group consisting of halogen, cyano, nitro, arsono, carbo-lower-alkoxy and lower alkyl, Z is selected from the group consisting of oxygen and sulfur, R is selected from the group consisting of hydrogen and lower alkyl, and $m$ and $n$ are integers from 0 to 3 except when X and Y are only halogen, $m$ and $n$ are integers from 0 to 5 in an organic solvent which permits the benzanilide to penetrate the cuticle of plants. The addition of a surfactant is preferred since it aids the benzanilides to penetrate the plant cuticle.

The solvent must have the ability to solubilize the benzanilide to prepare the necessary system to apply the compounds and must have the property of leaf penetration so it can carry the benzanilides within the plant tissue since the benzanilides are systemic herbicides. A preferred solvent is a mixture of an aromatic hydrocarbon and an oxygenated organic solvent.

Examples of suitable aromatic hydrocarbons for use are benzene, alkylated benzenes such as xylene, alkylated naphthalenes particularly methylated naphthalenes, etc.

Examples of suitable oxygenated organic solvents for use in the herbicidal compositions are lower alkyl esters of lower alkanoic acids such as methyl acetate, ethyl acetate, isopropyl acetate, etc.; alkanediols and ethers and esters thereof such as ethylene glycol, propylene glycol, monoethyl ether of ethylene glycol (Cellosolve), monophenyl ether of ethylene glycol (phenyl Cellosolve), monomethyl ether of ethylene glycol (methyl Cellosolve), monobutyl ether of ethylene glycol (butyl Cellosolve), diethylene glycol monobutyl ether acetate, 4-methyl-4-methoxy pentan-2-ol (Pent-Oxol), 4-methyl-4-methoxy-pentan-2-one (Pent-Oxone), etc.; acetophenone; dimethyl sulfoxide; isophorone, etc.

Aqueous preparation suitable for application to plants can be prepared by the addition of water to the said compositions containing a surfactant or emulsifying agent. Examples of suitable surfactant or emulsifying agents are non-ionic products such as condensation products of ethylene oxide with aliphatic alcohols, mercaptans, amines or carboxylic acids having 10 to 30 carbon atoms; anionic active products such as sulfonates and sulfates of high molecular weight compounds such as sodium dodecyl sulfate, sodium dodecylbenzenesulfonate, alkali metal petroleum-sulfonates, triethanol amine salts of oleic acid and/or abietic acid; and cationic products such as high molecular weight quaternary ammonium compounds such as cetylpyridinium bromide, di(hydroxyethyl)benzyldodecylammonium chloride, etc.

The concentration of the various components of the compositions of the invention may vary greatly. Usually the preferred compositions contain 1 to 10% of the benzanilide, 10 to 60% of the oxygenated organic solvent and 40 to 90% of the aromatic hydrocarbon. A preferred range of the ingredients in the preferred compositions is 5 to 10% of the benzanilide, 20 to 50% of the oxygenated organic solvent and 50 to 80% of the aromatic hydrocarbon. Up to 15% of surfactant may be added, preferably 5 to 10%.

The compositions, when applied to fields as aqueous solution suitable for direct spraying, may be applied by the broadcast method or row or band method at a dosage level of about 1 to 10 pounds per acre or higher. The dosage level for the row method is usually about one-quarter of the dosage level of the broadcast method.

A preferred embodiment of the invention is extremely useful for the post-emergence control of grass weeds in cotton fields without injuring the cotton plants and does not require a directed spray. The preferred compositions are comprised of (A) at least one benzanilide of Formula I, (B) an alkylated naphthalene and (C) a compound selected from the group consisting of lower alkyl acetates, diethylene glycol monobutyl ether acetate, 4 - methyl - 4 - methoxypentan - 2 - one, 4 - methyl - 4 - methoxypentan-2-ol, propylene glycol and isophorone.

These compositions have the advantage of killing practically all grass weeds without injuring the cotton when applied at a dosage of 2 to 4 pounds per acre by the band method.

Another embodiment of the invention for the control of weeds and which possesses synergistic herbicidal activity is comprised of (A) at least one benzanilide of Formula I in an organic solvent system which permits the composition to penetrate the cuticle of the plant and (B) a herbicidal oxidizing ion in aqueous solution. These synergistic compositions have the advantages that they can be applied at lower dosages, i.e. about 0.1 to 0.8 pound per acre by the band method and are active for 3 to 5 months as compared to about 4 to 5 weeks for compositions without oxidizing ions.

Examples of suitable oxidizing ions for the synergistic herbicidal compositions are dipyridylium salts such as 1,1'-ethylene-2,2'-bipyridylium dibromide (Diquat) and 1,1'-dimethyl-4,4'-bipyridylium di(methyl sulfate) (Paraquat); alkali metal and alkaline earth metal nitrate salts such as sodium nitrate, calcium nitrate, etc.; herbicidal arsenical compounds such as mono-lower alkanearsonic acids and lower dialkylarsinic acids such as methanearsonic acid, propanearsonic acid, dibutylarsinic acid, dipropylarsinic acid, cacodylic acid (hydroxydimethylarsine oxide), etc. and their alkali metal and alkaline earth metal salts such as monosodium methanearsonate (MSMA), disodium methanearsonate (DSMA), calcium hydrogen methanearsonate, and amine salts of the said arsonic acids where the amine is ethanolamine, diethanolamine, triethanolamine, isopropylamine, tri-isopropanolamine, mixtures of alkylamines having 8 to 14 carbon atoms, etc.

The most preferred embodiment of the invention gives both pre-emergence and post-emergence control of both grass and broad leaf weeds in cotton fields without injuring the cotton plants and does not require a directed spray. The preferred compositions are comprised of (A) at least one benzanilide of Formula I, (B) an alkylated naphthalene, (C) a compound selected from the group consisting of lower alkyl acetates, diethylene glycol monobutyl ether acetate, 4-methyl-4-methoxy-pentan-2-one, 4-methyl-4-methoxy-pentan-2-ol, propylene glycol and isophorone, and (D) a herbicidal arsenical compound such as a compound selected from the group consisting of lower alkanearsonic acids, di-lower alkanearsonic acids and alkali metal and amine salts thereof.

Control of grass and broad leaf weeds in cotton fields has in the past been accomplished almost exclusively by hand hoeing between the plants in each row and mechanical cultivation between the rows, but farm labor has tended to migrate to other areas. Within the last 3 to 5 years, certain pre-emergence herbicides have been tested as a means to control weeds in cotton. However, since cotton frequently requires planting two or three times because of adverse weather conditions, the pre-emergence herbicides have to be used more than once which increases the costs thereof. Also effective control of both grasses and broad leaf weeds has not been possible with pre-emergence herbicides.

Monosodium methanearsonate has been used as a post-emergence herbicide in cotton fields but it must be used in high dosage levels of 4 to 8 pounds per acre with a directed spray because serious cotton injury occurs if the said compound contacts the cotton plants. Monosodium methanearsonate gives only post-emergence herbicidal action on grasses primarily and requires repeated applications during the growing season to kill grasses growing from rhizomes. Also, the high dosage levels of the arsonate compound presents a residue problem. The herbicidal compositions containing only the benzanilides of Formula I as the active agent give good post-emergence control of grasses in cotton fields at dosages of 2 to 4 pounds per acre, but three to four applications are required during the growing season and effective treatment is, therefore, relatively expensive.

In contrast thereto, the novel synergistic herbicidal compositions give effective control of all grasses and broad leaf weeds found in cotton for an entire season with one application of low dosages of 0.1 to 0.3 pound per acre with a non-directed spray since the compositions are not toxic to cotton at these dosages.

Various vines such as morning-glories, bindweed, trumpet vine, etc. cocklebur which has not previously been successfully controlled by chemical means and grasses such as Johnson grass, nut grass, etc. are all readily controlled. Since cotton plants at all stages of growth of maturity are completely tolerant to the compositions of the invention, the compositions may be applied at any time with complete elimination of all noxious weeds without injury to cotton. Although the said compositions are applied post-emergence to the cotton, they have post-emergence and pre-emergence herbicidal activity against the weeds.

In addition to their post-emergence herbicidal activity, certain of the benzanilides of Formula I possess pre-emergence activity. For example, 2-bromo-4'-cyanobenzanilide and 2-bromo-2',4'-dichlorobenzanilide are effective pre-emergence herbicides for broadleaf weeds.

In addition to their post-emergence herbicidal activity, the compositions containing a benzanilide possess antimildew activity and are useful for protecting plants such as bean seedlings from mildew attack (*E. polygoni*). The said compositions do not kill the mildew spores but immunize the plants (systemically).

In the following examples there are described several preferred embodiments to illustrate the invention. However, it should be understood that the invention is not intended to be limited to the specific embodiments.

EXAMPLE I

The benzanilides of the invention were prepared by reacting the appropriate aniline with the desired benzoic acid chloride of benzoic acid anhydride. Table I lists a number of compounds of the invention with their melting points.

TABLE I.—BENZANILIDES OF THE FORMULA

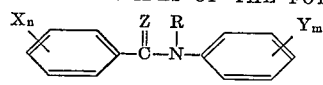

| Z | $Y_m$ | $X_n$ | R | Melting Point, °C. |
|---|---|---|---|---|
| O | 3',4'-dichloro | H | H | 148.0–149.5 |
| O | 2',4'-dichloro | H | H | 117.0–118.0 |
| O | 2',3'-dichloro | H | H | 122.0–122.5 |
| O | 3'-chloro-4'-methyl | H | H | 121.0–122.0 |
| O | H | H | H | 163.0 |
| O | 3',4'-dichloro | 3,4-dichloro | H | 233.5–234.5 |
| O | H | 3,4-dichloro | H | 180.0–181.0 |
| O | 4'-chloro | H | H | 194.5–195.5 |
| O | 3'-chloro | H | H | 123.5–124.0 |
| O | 2'-chloro | H | H | 105.0 |
| O | 2',5'-dichloro | H | H | 121.5–122.0 |
| O | 3'-bromo | H | H | 133.0–134.0 |
| O | 2'-chloro-6'-methyl | H | H | 147.5–148.0 |
| O | 2'-chloro-5'-methyl | H | H | 121.0–122.0 |
| O | 2',6'-dichloro | H | H | 159.0 |
| O | 2',4'-dichloro | 3,4-dichloro | H | 160.0–160.5 |
| O | 3',4'-dichloro | 2-bromo | H | 158.5–159.5 |
| O | 2',4'-dichloro | 2-bromo | H | 125.0–126.5 |
| O | 3'-chloro | 3-chloro | H | 112.0–113.0 |
| O | 2',6'-dichloro | 3-chloro | H | 158.0–159.0 |
| O | 3'-bromo | 2-bromo | H | 149.0–150.0 |
| O | 2'-bromo-3'-chloro | H | H | 157.0 |
| O | 3'-chloro-6'-methyl | H | H | 143.0–143.5 |
| O | 3'-chloro | 3,4-dichloro | H | 140.0–141.5 |
| O | 3'-chloro | 2-chloro | H | 137.0–137.5 |
| O | 3'-chloro | 4-chloro | H | 123.5–124.0 |
| O | 3'-chloro | 2,4-dichloro | H | 112.0–113.5 |
| O | 3'-chloro | 4-methoxy | H | 133.0–134.5 |
| O | H | 2-bromo | H | 123.0–124.0 |
| O | H | 4-nitro | H | 216.5–217.0 |
| O | 3',4'-dichloro | 4-nitro | H | 258.0–259.0 |
| O | 2',4'-dichloro | 4-nitro | H | 171.0–172.0 |
| O | 2',6'-dichloro | 4-nitro | H | 94.5–95.5 |

TABLE I—Continued

| Z | Y_m | X_n | R | Melting Point, °C. |
|---|---|---|---|---|
| O | 3'-chloro | 3-nitro 4-methyl | H | 154.0-156.0 |
| O | 3'-chloro | 2-methyl | H | 156.0-157.0 |
| O | 2',4',5'-trichloro | H | H | 169.0-170.0 |
| O | 3'-methyl | H | H | 127 |
| O | 2',6'-dichloro | 2-bromo | H | 190.0-192.0 |
| O | 2',6'-dichloro | 3,4-dichloro | H | 222.0-223.0 |
| O | 3'-methyl | 2-bromo | H | 142.0-143.5 |
| O | 3'-methyl | 3,4-dichloro | H | 117.0-118.0 |
| S | 3'-chloro | H | H | 122.0-124.0 |
| S | 3',4'-dichloro | H | H | 142.0-146.0 |
| O | 3'-chloro | 4-nitro | H | 167.5-168.5 |
| O | H | 4-nitro | H | 216.5-217.0 |
| O | 3',4'-dichloro | 4-nitro | H | 258.0-259.0 |
| O | 2',4'-dichloro | 4-nitro | H | 171.0-172.0 |
| O | 2',6'-dichloro | 4-nitro | H | 94.5- 95.5 |
| O | 4'-chloro | H | CH_3 | (1) |
| O | H | 4-nitro | CH | 110.0-111.0 |
| O | 3'-chloro | 3-nitro-4-methyl | H | 154.0-156.0 |
| O | 2',4'-dimethyl | 4-methyl-3-amino | H |  |
| O | 3'-chloro | 2-methyl | H | 156.0-157.0 |
| O | 4'-arsono | H | H | (2) |
| O | 4'-nitro | 4-nitro | H | 268.5-269.0 |
| O | 4'-nitro | H | H | 202.0-202.5 |
| O | 3'-nitro | H | H | 153.0-154.0 |
| O | 3'-nitro | 4-nitro | H | 238.0-239.0 |
| O | 4'-nitro | 2-bromo | H | 196.0-197.0 |
| O | 4'-nitro | 3,4-dichloro | H | 204.0-205.0 |
| O | 3'-chloro | 4-carbomethoxy | H | 158.0 159.0 |
| O | 3',4'-dichloro | 4-carbomethyoxy | H | 175.5-176.5 |
| O | 2',4'-dichloro | 4-carbomethyoxy | H | 168-5-170.0 |
| O | 4'-carboethoxy | H | H | 151.5-152.0 |
| O | 4'-cyano | 3-nitro | H | 251.0-252.0 |
| O | 4'-cyano | H | H | 169.0-170.0 |
| O | 4'-cyano | 2-bromo | H | 189 |
| O | 4'-cyano | 3,4-dichloro | H | 180.0-181.0 |

[1] Liquid.
[2] Above 335.0.

EXAMPLE II

*General post-emergence herbicidal activity*

To demonstate the general herbicidal activity of the benzanilide composition of the invention, benzanilides were applied to seven different types of plants according to the following procedure:

The compounds were prepared as 10% emulsion concentrates in two specific types of solvents systems as follows:

FORMULA F

Compound _____percent by weight__ 10
Triton X-161 _____do____ 10
Solvent _____percent by volume__ 80

FORMULA 50M

Compound _____percent by weight__ 10
Triton X-161 _____do____ 10
Solvent 50M _____percent by volume__ 80

Triton X-161 is a blend of anionic and non-ionic alkyl aryl polyether alcohols and organic sulfonates. Solvent F is a 50:50 by volume mixture of diethylene glycol monobutyl ether acetate and Velsicol AR 50 (methylated naphthalenes). Solvent 50M is a 20:80 by volume mixture of ethyl acetate and Velsicol AR 50. Before application, the concentrates were diluted to a concentration of 2000 p.p.m. of the compound being tested.

The seven crops to be tested had been planted in flats 10 to 12 days before the tests and were well established seedlings. The plants were sprayed by a precision turntable technique in which 30 ml. of the spray solution (about 2.5 pounds per acre) were applied to each flat containing the seven crops. The plants were then kept under constant daily surveillance for a period of 7 to 14 days. The final phytotoxicity data was recorded at the end of 14 days and the plants were scored for phytotoxicity ratings on a scale from 0 (no injury to plants) to 10 (all the plants were killed). The results of the tests are summarized in Table II.

TABLE II-A.—POST-EMERGENCE HERBICIDAL ACTIVITY OF BENZANILIDES OF FORMULA I

| Benzanilide | Solvent | Phytotoxicity rating | | | | | | |
|---|---|---|---|---|---|---|---|---|
| | | Beets | Tomato | Radish | Flax | Rye grass | Oats | Wheat |
| 3',4'-dichlorobenzanilide | F | 9+ | 9+ | 9+ | 9+ | 9+ | 9+ | 4 |
| | 50M | 10 | 9+ | 9+ | 9+ | 9 | 8 | 3 |
| 2',4'-dichlorobenzanilide | F | 2 | 2 | 5 | 9 | 9 | 2 | 2 |
| 2',3'-dichlorobenzanilide | F | 3 | 1 | 4 | 9 | 9 | 5 | 2 |
| 3'-chloro-4'-methylbenzanilide | F | 2 | 2 | 1 | 9 | 9 | 3 | 4 |
| Benzanilide | F | 10 | 10 | 10 | 10 | 9 | 9 | 9 |
| | 50M | 9 | 9 | 10 | 10 | 10 | 9 | 9 |
| 3,3',4,4'-tetrachlorobenzanilide | F | 3 | 8 | 6 | 8 | 6 | 5 | 4 |
| | 50M | 1 | 2 | 2 | 8 | 3 | 3 | 3 |
| 3,4-dichlorobenzanilide | F | 5 | 8 | 5 | 5 | 3 | 1 | 1 |
| 3'-chlorobenzanilide | F | 10 | 10 | 10 | 10 | 9 | 10 | 10 |
| 2'-chlorobenzanilide | F | 0 | 9 | 4 | 9 | 6 | 5 | 7 |
| | 50M | 1 | 5 | 5 | 9 | 5 | 8 | 7 |
| 2',5'-dichlorobenzanilide | F (1) | 2 | 0 | 2M | 6 | 3 | 6 | 6 |
| | (2) | -I | -I | IM | 6-I | 3 | 3 | 7 |
| | 50M (1) | 2 | 1 | 2 | 7 | 6 | 9 | 8 |
| | (2) | -I | -I | IM | 6-I | 3 | 4 | 6 |
| 4-nitrobenzanilide | F | 6 | 1 | 1 | 8 | 1 | 0 | 0 |
| | 50M | 6 | 2 | 9 | 9 | 0 | 7 | 6 |
| 2',4'-dichloro-4-nitrobenzanilide | F | 10 | 1 | 7 | 5 | 3 | 4 | 5 |
| | 50M | 10 | 8 | 7 | 5 | 3 | 3 | 3 |
| 3',4'-dichloro-4-nitrobenzanilide | F | 4 | 2 | 4 | 9 | 9 | 8 | 8 |
| 2'-chloro-6'-methylbenzanilide | F (1) | 0 | 3 | 2 | 6 | 2 | 2 | 2 |
| | (2) | 0 | 4 | 2 | 4 | | | |
| | 50M (1) | 7 | 7 | 7 | 6 | 4 | 2 | 2 |
| | (2) | 7 | 5 | 8 | 7 | 3 | 1 | 1 |
| 5'-chloro-2'-methylbenzanilide | F (1) | 0 | 2 | 3 | 5 | 4 | 4 | 4 |
| | (2) | 0 | 1 | +3 | 3 | 3 | 4 | 4 |
| | 50M (1) | 4 | 10 | 4 | 4 | 2 | 2 | 2 |
| | (2) | 4 | 9 | 1+5 | 4 | 2 | 2 | 2 |
| 2'-chloro-5'-methylbenzanilide | F (1) | 0 | 1 | 2 | 4 | 0 | 2 | 2 |
| | (2) | 0 | 1 | +3 | 3 | 2 | 3 | 2 |
| | 50M (1) | 4 | 2 | 3 | 4 | 2 | 4 | 1 |
| | (2) | 4 | 2 | 1+5 | 4 | 2 | 3 | 3 |

TABLE II-A—Continued

| Benzanilide | Solvent | Phytotoxicity rating | | | | | | |
|---|---|---|---|---|---|---|---|---|
| | | Beets | Tomato | Radish | Flax | Rye grass | Oats | Wheat |
| 2',6'-dichlorobenzanilide | F (1) | 0 | 0 | 1 | 5 | 2 | 2 | 2 |
| | (2) | 0 | 1 | 2 | 5 | 2 | 2 | 2 |
| | 50M (1) | 0 | 3 | 8 | 6 | 3 | 3 | 3 |
| | (2) | 1 | 3 | 9 | 7 | 3 | 4 | 4 |
| 2',3,4',4-tetrachlorobenzanilide | F (1) | 1 | 1 | 1 | 5 | 0 | 1 | 1 |
| | (2) | 2 | 2 | 3-I | 5 | 1 | 1 | 1 |
| | 50M (1) | 2 | 3 | 3 | 5 | 1 | 1 | 3 |
| | (2) | 5-I | 2 | 4-I | 2 | 0 | 0 | 0 |
| 2-bromo-3',4'-dichlorobenzanilide | F (1) | 10 | 9 | 4 | 4 | 5 | 10 | 9 |
| | (2) | 10 | 9 | 7-I | 7-I | 6 | 8 | 4 |
| | 50M, (1) | 3 | 10 | 1 | 1 | 1 | 5 | 3 |
| | (2) | 5 | 10 | 5-I | 0 | 0 | 2 | 1 |
| 2-bromo-2',4'-dichlorobenzanilide | F | 8 | 9+ | 0 | 7 | 5 | 0 | 0 |
| | 50M | 9 | 9+ | 2 | 2 | 4 | 2 | 0 |
| 2',6'-dichloro-4-nitrobenzanilide | F | 0 | 5 | 4 | 10 | 4 | 0 | 2 |
| | 50M | 7 | 9 | 10 | 9 | 1 | 8 | 4 |
| 3,3'-dichlorobenzanilide | F | 5 | 2 | 4 | 2 | 1 | 0 | 0 |
| | 50M | 7 | 10 | 10 | 9 | 5 | 9 | 1 |
| 3',4'-dichloro-4-nitrobenzanilide | F | 4 | 2 | 4 | 9 | 9 | 8 | 8 |
| 2',4'-dichloro-4-nitrobenzanilide | F | 10 | 1 | 7 | 5 | 3 | 4 | 5 |
| | 50M | 10 | 8 | 7 | 5 | 3 | 3 | 3 |
| 4'-cyanobenzanilide | F | 0 | 0 | 0 | 5 | 0 | 10 | 5 |
| | 50M | 4 | 3 | 0 | 5 | 2 | 7 | 5 |
| N-methyl-4-nitrobenzanilide | F | 0 | 6 | 7 | 8 | 7 | 9 | 5 |
| | 50M | 5 | 10 | 9 | 7 | 10 | 10 | 9 |
| 2',4',4-trimethyl-3-aminobenzanilide | F | 3 | 7 | 7 | 10 | 2 | 2 | 1 |
| | 50M | 9 | 8 | 9 | 10 | 5 | 2 | 1 |
| 2',6'-dichloro-4-nitrobenzanilide | F | 0 | 5 | 4 | 10 | 4 | 0 | 2 |
| | 50M | 7 | 9 | 10 | 9 | 1 | 8 | 4 |
| 4'-acetylbenzanilide | F | 4 | 4 | 4 | 10 | 2 | 1 | 1 |
| | 50M | 6 | 6 | 4 | 8-I | 2 | 1 | 1 |
| 4'-cyano-3-nitrobenzanilide | F | 1 | 3 | 1 | 9 | 1 | 2 | 4 |
| | 50M | 1 | 6 | 2 | 1 | 0 | 0 | 0 |
| 2',4'-dichloro-4-carbomethoxybenzanilide | 50M | 5-I | 6-I | 6-I | 6 | 6 | 9 | 2 |
| 4'-arsonobenzanilide | F | 8 | 9 | 9 | 10 | 9 | 8 | 9 |
| | 50M | 10 | 10 | 10 | 10 | 9 | 9 | 9 |
| Control | F (1) | 2 | 1 | 0 | 2 | 1 | 1 | 1 |
| | (2) | 1 | 1 | 1-I | 2 | 0 | 0 | 0 |
| | 50M (1) | 6 | 2 | 3 | 1 | 1 | 5 | 5 |
| | (2) | 5 | 1 | 2 | 1 | 1 | 1 | 1 |

¹ Plus chlorotic.
See footnotes at end of Table II-b.

TABLE II-B

| Benzanilide | Solvent | Phytotoxicity rating | | | | | | |
|---|---|---|---|---|---|---|---|---|
| | | Beets | Tomato | Radish | Cucumber | Johnson grass | Oats | Wheat |
| 2',3,6'-trichlorobenzanilide | F (1) | 1 | 4 | 6 | 7 | 10 | 6 | 6 |
| | 50M (2) | 3 | 3 | 3 | 3 | 10 | 6 | 6 |
| | F (1) | 0 | 0 | 3-IM | 10 | 7 | 9 | 7 |
| | 50M (2) | 1 | 1-M | 3-IM | 8-IM | 7 | 5 | 5 |
| 3'-methylbenzanilide | F | 10 | 10 | 6 | 5 | 10 | 10 | 10 |
| | 50M | 2 | 9 | 2 | 3 | 1 | 0 | 0 |
| 3'-dichloro-2-methylbenzanilide | F | 8 | 9 | 7 | 4 | 10 | 4 | 3 |
| | 50M | 8 | 5 | 2 | 3 | 8 | 1 | 1 |
| 3'-chloro-3-nitro-4-methylbenzanilide | F | 8 | 5 | 8 | 9 | 6 | 1 | 1 |
| 2,3',4-trichlorobenzanilide | F | 8 | 7 | 7 | 7 | 6 | 0 | 0 |
| | 50M | 6 | 5 | 4 | 7 | 1 | 0 | 0 |
| 3'-chloro-4-methoxybenzanilide | F | 10 | 7 | 9 | 8 | 8 | 8 | 3 |
| | 50M | 8.5 | 8 | 4 | 2 | 1 | 1 | 1 |
| 4'-nitrobenzanilide | F | 6 | 1 | 1 | 8 | 1 | 0 | 0 |
| | 50M | 6 | 2 | 9 | 9 | 0 | 7 | 6 |
| 3,4-dichloro-4'-cyanobenzanilide | F | 7 | 5 | 5 | 2 | 3 | 3 | 1 |
| 3',4'-dichloro-4-carbomethoxybenzanilide | 50M | 0 | 0 | 2 | 5-M | 8 | 9 | 1 |

(1) Indicates that the plants were scored 7 days after application.
(2) Indicates that the plants were scored 2 weeks after application.
(I) Indicates inhibition of plant growth.
(M) Morphological changes of the plants, usually leaf shape.

EXAMPLE III

*Selective post-emergence herbicidal activity against Johnson grass in cotton*

The benzanilides tested were all tested as 10% emulsion concentrates using 0.5 gm. of the benzanilides and 4.5 ml. of a solvent consisting of 45% AR 50, 45% butyl Carbitol acetate and 10% Triton X–161 which was diluted with 100 ml. of water. The said solution was used for spraying the plants of a gallonage of 17 gallons per acre or 2.0 pounds of the benzanilide per acre.

The flats sprayed contained plants sown in rows alternating cottton plants with Johnson grass and at the time of spraying the cotton was in the seedling state and the Johnson grass was about ½ to 1 inch in height or the seedling stage. Pots of cotton were also sprayed in which the cotton was in the 4-leaf stage with 2 well developed true leaves and 2 cotyledonary leaves. Pots of red kidney beans having 2 well-developed true leaves and pots of Johnson grass 1 inch and 3 inches in height were also sprayed. The data is presented in Table III using the phytotoxicity ratio of 0 to 10.

TABLE III

| Benzanilide | Pyhtotoxicity rating | | | | | |
|---|---|---|---|---|---|---|
| | Flats | | Pots | | | |
| | Johnson grass | Cotton | 4-leaf cotton | Beans | 1-inch Johnson grass | 3-inch Johnson grass |
| 4′-chloro: | | | | | | |
| (1) | 9 | 3 | 1 | 1 | 5 | 8 |
| (2) | 9 | 2 | 0.5 | 1 | 4 | 4 |
| 3′-chloro | 8 | 2 | 4 | 1 | 5 | 7 |
| | 9 | 4 | 2 | 1 | 5 | 8 |
| 2′-chloro | 10 | 8 | 3 | 5 | 7 | 9 |
| | 9 | 8 | 2 | 4 | 8 | 10 |
| 2′,5′-chloro | 6 | 2 | 2 | 1 | 3 | 5 |
| | 9 | 2 | 1 | 5 | 3 | 3 |
| 3′-bromo | 9 | 1 | 1 | 1 | 9 | 3 |
| | 9 | 2 | 1 | 1 | 3 | 3 |
| 4-nitro | 9 | 5 | 2 | 1 | 1 | 8 |
| | 8 | 4 | 0.5 | 1 | 2 | 5 |
| 2′,4′-dichloro-4-nitro | 9 | 2 | 1 | 1 | 4 | 8 |
| | 8 | 3 | 5 | 1 | 1 | 2 |
| 2′,6′-dichloro-4-nitro | 10 | 7 | 5 | 1 | 5 | 9 |
| | 10 | 4 | 3 | 3 | 5 | 9−D |
| 2′-chloro-6′-methyl | 10 | 1 | 1 | 1 | 2 | 6 |
| | 9 | 1 | 0.5 | 2 | 2 | 5 |
| 2′-chloro-5′-methyl | 10 | 1 | 1 | 1 | 5 | 9 |
| | 6 | 2 | 1 | 2 | 2 | 4 |
| 2′,3,4′,4-tetrachloro | 9 | 2 | 1 | 1 | 3 | 7 |
| | 9 | 2 | 1 | 1 | 2 | 4 |
| 2-bromo-2′,6′-dichloro | 8 | 2 | 1 | 1 | 7 | 4 |
| | 4 | 1 | 1 | 1 | 6 | 1 |
| 2′,3,4,6′-tetrachloro | 8 | 1 | 1 | 1 | 5 | 5 |
| | 8 | 1 | 1 | 0 | 1 | 2 |
| 3,3′-dichloro | 9 | 2 | 1 | 1 | 7 | 6 |
| | 8 | 2 | 0.5 | 0.5 | 6 | 4 |
| 2-bromo-3′-chloro | 7 | 1 | 1 | 1 | 6 | 3 |
| | 9.5 | 0.5 | 0.5 | 0.5 | 6 | 4 |
| 2,3′,4-trichloro | 7 | 3 | 1 | 8 | 7 | 5 |
| 3′-chloro-4-methoxy | 6 | 1 | 1 | 1 | 8 | 5 |
| 3′,4′-dichloro | 10 | 2 | 1 | 2 | 1 4 | 10 |
| 2-bromo-3′,4′-dichloro | 8.5 | 3 | 1 | 8 | 1 4 | 9 |
| 4-nitrobenzanilide | 9 | 5 | 2 | 1 | 1 | 8 |
| | 8 | 4 | 0.5 | 1 | 2 | 5 |
| 2′,4′-dichloro-4-nitrobenzanilide | 9 | 2 | 1 | 1 | 4 | 8 |
| | 8 | 3 | 1 | 1 | 1 | 2 |
| 4′-nitrobenzanilide | 10 | 3 | 2 | 1 | 7 | 7 |
| | 10 | 5 | 3 | 1 | 6 | 7 |
| 4,4′-dinitrobenzanilide | 9 | 3 | 1 | 1 | 6 | 7 |
| | 8 | 3 | 2 | 1 | 3 | 3 |
| 4′-cyanobenzanilide | 10 | 2 | 1 | 1 | 8 | 9 |
| | 8 | 2 | 1 | 2 | 5 | 7 |
| 3′,4′-dinitrobenzanilide | 9 | 1 | 1 | 1 | 6 | 6 |
| | 6 | 3 | 1 | 0 | 2 | 2 |
| 2′,6′-dichloro-4-nitrobenzanilide | 10 | 7 | 5 | 1 | 5 | 9 |
| | 10 | 4 | 3 | 3 | 5 | 9 |
| 4′-acetylbenzanilide | 10 | 3 | 1 | 2 | 4 | 10 |
| | 5 | 4 | 1 | 2 | 2 | 4 |
| 4′-cyano-3-nitrobenzanilide | 8.5 | 2 | 2 | 1 | 5 | 9 |
| | 2 | 1 | 1 | 1 | 2 | 4 |

TABLE III—Contiued

| Benzanilide | Pyhtotoxicity rating | | | | | |
|---|---|---|---|---|---|---|
| | Flats | | Pots | | | |
| | Johnson grass | Cotton | 4-leaf cotton | Beans | 1-inch Johnson grass | 3-inch Johnson grass |
| 3',4'-dichloro-4-carbomethoxybenzanilide | | | 1 | 1 | | 9 |
| | | | 0 | 1 | | 7 |
| Solvent F, Alone | 4 | 1 | 0 | 1 | 2 | |
| | 4 | 1 | 0 | 1 | 2 | |

[1] Growth stopped.
See footnotes at end of Table II-b.

EXAMPLE IV

Field tests were conducted to demonstrate the control of grass weeds in cotton fields. The cotton was sprayed with one gallon hand sprayers at a pressure of 25 p.s.i. about 10 days after occasional cotyledonary leaves were just breaking the ground at which time the ground was covered with a literal green mat of seedling Johnson grass, crab grass, and nut grass. A 12-inch band was sprayed on each side of the cotton rows leaving an untreated area between the rows which acted as a control. The compositions were emulsion concentrates as in Example II of 3'-chlorobenzanilide diluted with water to the desired dilution and the aqueous solution was applied at a dosage of 25 gallons per acre. The results are summarized in Table IV.

TABLE IV

| Benzanilide | Solvent | Dosage, lbs. per acre | Phytotoxicity rating | |
|---|---|---|---|---|
| | | | Cotton | Grasses |
| 3'-chlorobenzanilide | F | 2.8 | 1 | 9.5 |
| | F | 2.0 | 0 | 9.5 |
| | F | 1.4 | 0 | 7.5 |
| | 50M | 2.8 | 0 | 9.5 |
| | 50M | 2.0 | 0 | 8.5 |
| | 50M | 1.4 | 0 | 8.0 |

EXAMPLE V

Anti-mildew activity

Red kidney beans were grown in 4-inch clay pots to a stage of growth where the cotyledonary leaves were well expanded and essentially full grown and the first primordial growth of the first true leaves had occurred which was approximately two weeks from the time of planting. The plants were left in a separate greenhouse with other bean plants heavily infested with bean mildew (*Erysiphe polygoni*) for a constant source of inoculum. The plants were sprayed in groups of three pots on a precision turntable with 30 ml. of an aqueous solution of the emulsion concentrates of the benzanilides in solvent F.

After two weeks, the plants were checked for the extent of mildew. Mildew on beans is very conspicuous due to the masses of white mycelial growth and sporulation on the upper surfaces of the leaves. Infected areas on the cotyledonary leaves may first appear as light brown, irregular shaped areas or lesions that tend to coalesce if the infection is very heavy. The anti-mildew activity rating was based on a range of 0 (no control) to 5 (100% control). The results are summarized in Table V.

TABLE V

| Benzanilide | Dosage, p.p.m. | Anti-mildew activity rating | | | Phytotoxicity rating |
|---|---|---|---|---|---|
| | | Primary leaves | 1st true leaves | 2d true leaves | |
| 2-bromo-3',4'-dichlorobenzanilide | 1,000 | 5 | 3 | 1 | |
| 3'-bromobenzanilide | 1,000 | 5 | 0 | 0 | |
| 2'-chlorobenzanilide | 1,000 | 4.5 | 3 | | |
| 3'-chlorobenzanilide | 1,000 | 4.5 | 2 | 0 | 0 |

The results of Table V show that the compositions of the invention give complete protection to sprayed portions of the plant and some of them possess systemic activity since the true leaves which developed after the spraying were protected.

EXAMPLE VI

To demonstrate the use of various oxygenated organic solvents in the herbicidal compositions, concentrates of 25 ml. of Velsicol AR–50, 5 gm. of Triton X–161, 2.5 gm. of 3'-dichlorobenzanilide and 20 ml. of the test solvent were prepared and were diluted with water and applied to the following test crops at a dosage rate of 0.84 pound of 3'-chlorobenzanilide per acre. The phytotoxicity ratings are summarized in Table VI.

The test crops were flats of 17 day old Johnson grass and cotton, flats of 37 day old Johnson grass and cotton, pots of 23 day old red kidney beans, pots of 26 day old cotton, pots of 14 day old Johnson grass (1 inch) and pots of 22 day old Johnson grass (3 inch). The phytotoxicity data was taken one week after application.

3′-chlorobenzanilide was prepared as a 10% by weight concentrate in a solvent system comprised of 50% by volume of Velsicol AR 50 (alkylated naphthalenes) 40% by volume of butyl Carbitol acetate and 10% by volume of Triton X–161 (mixture of alkylaryl polyether alcohols and organic sulfonates) and monosodium methanearsonate (MSMA) was prepared as a 10% by weight aqueous solution. The compositions were diluted with sufficient water to make two liters of final spray solution.

The final solutions were sprayed with a non-directed spray at a uniform pressure of 40 p.s.i. on cotton in the seeding stage of growth by the band method. The test field area used had actually been abandoned because of the weed problem existant in the field and Johnson grass was rampant along with 2 or 3 various species of Amaranthus (pigweeds), various types of creeping vines and cocklebur. Phytotoxicity ratings were recorded at weekly intervals on a scoring system of 0 (no injury) to 10 (complete kill). The phytotoxicity data six weeks after the spraying are shown in Table IX.

TABLE IX

| Ml. of 10% 3-chlorobenzanilide | Ml. of 10% MSMA | Phytotoxicity rating | | | | |
|---|---|---|---|---|---|---|
| | | Johnson grass | Cotton | Pigweed | Vines | Cocklebur |
| 60 | 0 | 1.0 | 0 | 0 | 0 | 0 |
| 80 | 0 | 2.0 | 0 | 0-I | 0-I | 1-I |
| 100 | 0 | 3.0 | 0 | 1-I | 1-I | 1-I |
| 0 | 40 | 0 | 0 | 0 | 0 | 0 |
| 0 | 60 | 2.0 | 1 | 1 | 0 | 0 |
| 0 | 80 | 2.0 | 2 | 1 | 0 | 1 |
| 0 | 100 | 3.0 | 5 | 2 | 1 | 2 |
| 60 | 40 | 7.0 | 0 | 7 | 7 | 7 |
| 60 | 60 | 8.0 | 0 | 7.5 | 7 | 8 |
| 60 | 80 | 8.5 | 0 | 8 | 8 | 8 |
| 60 | 100 | 9.0 | 0 | 8.5 | 8 | 9 |
| 80 | 40 | 8.5 | 0 | 8.5 | 8 | 9.5 |
| 80 | 60 | 9.5 | 0 | 9 | 9.5 | 9.5 |
| 80 | 80 | 10 | 0 | 10 | 9.5 | 10 |
| 80 | 100 | 10 | 0 | 10 | 10 | 10 |
| 100 | 40 | 9.0 | 0 | 9 | 9 | 8.5 |
| 100 | 60 | 9.5 | 0 | 9.5 | 9.5 | 9.5 |
| 100 | 80 | 9.5 | 0 | 9.5 | 9.5 | 10 |
| 100 | 100 | 10 | 0 | 10 | 9.5 | 10 |
| Untreated check | | 0 | 0 | 0 | 0 | 0 |

I=Inhibition.

Early phytotoxicity readings with 3′-chlorobenzanilide alone against Johnson grass were of the order of 7 to 8.5 but the residual action of the said benzanilide was not sufficient to inhibit the Johnson grass growth with the resulting low ratings in Table II. All the Johnson grass above ground at the time of application was killed and the low phytotoxicity ratings of Table II are due to new growth from seedlings and rhizomes. There was no injury to the cotton.

Monosodium methanearsonate alone was only weakly to moderately active on Johnson grass at these levels and only weakly active on the pigweeds, vines and cocklebur at these dosage levels and the action at all times was the same as that shown in Table II. However, it caused moderate injury to the cotton manifested by stunting of the plants, reddening or purpling of the stems and leaf petioles and prohibition of setting of square or bolls on the cotton plants resulting in reduced cotton yields.

The synergistic herbicidal activity of the compositions of the invention is easily seen from Table II wherein both Johnson grass and the broad leaf weeds were effectively controlled (85 to 100% kill) without any damage whatsoever to the cotton. Although the application was made post-emergence, much of the activity was pre-emergence since new growth was prevented. The control rows had to be hand hoed every 7 to 10 days to keep down the growth of noxious grasses and weeds and some of the cotton plants were damaged during the hoeing. Observation of the rows treated with the compositions of the invention until maturity of the cotton showed that the same degree of weed control was exerted throughout the growing season.

EXAMPLE X

To demonstrate that the compositions of the invention may be applied at any stage of cotton and weed growth, a mixture of 80 ml. of the 10% concentrate of 3-chlorobenzanilide and 80 ml. of 10% aqueous MSMA solution were mixed together and diluted with water to a final spraying solution of 2 liters and were applied later in separate tests as a rate of about 0.24 pound per acre when the Johnson grass had reached a height of 18 inches and Johnson grass five feet in height and in blossom. In each case, 100% control of both Johnson grass and the broadleaf weeds was obtained with no injury to the cotton.

In field trials in Central and South America, mixtures of 3′-chlorobenzanilide and paraquat completely controlled the growth of nut grass (major weed problem) on cotton, banana and pineapple plantations with a single application which higher dosages of paraquat alone failed to do. Directed spray application were used.

Various modifications of the compositions and method of the invention may be made without departing from the spirit or scope thereof and it is to be understood that the invention is to be limited only as defined in the appended claims.

We claim:
1. Post-emergence herbicidal compositions comprising a herbicidally effective amount of mixtures of (A) at least one benzanilide of the formula

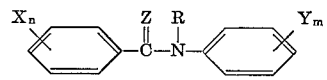

I wherein X is selected from the group consisting of halogen, lower alkyl, lower alkoxy, carbo-lower-alkoxy, amino, cyano, arsono, acetyl and nitro, Y is selected from the group consisting of halogen, cyano, nitro, arsono, carbo-lower-alkoxy and lower alkyl, Z is selected from the group consisting of oxygen and sulfur, R is selected from the group consisting of hydrogen and lower alkyl, and $m$ and $n$ are integers from 0 to 3 except when X and Y are only halogen, $m$ and $n$ are integers from 0 to 5, (B) an aromatic hydrocarbon and (C) an oxygenated organic solvent and (D) a synergistic amount of a herbicide with an oxidizing ion selected from the group consisting of mono-lower alkane arsonic acids, di-lower alkylarsinic acids and their alkali metal, alkaline earth metal and amine salts, 1,1′-diethylene-2,2′-dipyridylium dibromide and 1,1′-dimethyl-4,4′-dipyridylium di(methyl sulfate).

2. The compositions of claim 1 which contain a surfactant.

TABLE VI

| Oxygenated Solvent | Phytotoxicity ratings | | | | | | | |
|---|---|---|---|---|---|---|---|---|
| | 17 day flat | | 37 day flat | | Pots | | | |
| | Johnson grass | Cotton | Johnson grass | Cotton | Cotton | Beans | 1″ J. grass | 3″ J. grass |
| Monobutyl ether of ethylene glycol | 6 | 4 | 8 | 4 | 3 | 1.5 | 6 | 4 |
| Monomethyl ether of ethylene glycol | 5 | 2 | 8 | 5 | 1.5 | 0.5 | 4 | 2 |
| Isopropyl acetate | 8 | 2 | 9 | 2 | 1.5 | 2 | 8 | 5 |
| Methyl acetate | 9 | 5 | 9 | 2 | 3 | 2 | 6 | 6 |
| Diethylene glycol monobutyl ether acetate | 10 | 2 | 10 | 2 | 1 | 1 | 10 | 10 |
| Acetophenone | 9.5 | 3 | 9.5 | 5 | 2 | 2 | 10 | 4 |
| Monophenyl ether of ethylene glycol | 10 | 9 | 8 | 8 | 10 | 5 | 6 | 4 |
| Monoethyl ether of ethylene glycol | 6 | 4 | 8 | 4 | 5 | 4 | 2 | 1 |
| Propylene glycol | 9 | 3 | 7 | 4 | 2 | 1 | 8 | 9 |
| Dimethylsulfoxide | 7 | 2 | 7 | 3 | 2 | 2 | 8 | 4 |
| Pent-Oxone | 9.5 | 2 | 9 | 2 | 2 | 2 | 9 | 3 |
| Pent-Oxol | 7 | 1 | 9 | 1 | 1 | 1 | 7 | 7 |
| Isophorone | 10 | 1 | 9 | 3 | 1.5 | 1 | 9 | 9 |

EXAMPLE VII

*Pre-emergence herbicidal activity*

Flats were carefully filled with soil and were planted with rows of 25 seeds each of beets, tomatoes, radishes, oats, milo, turnips and wheat, 50 seeds of Johnson grass, 20 seeds of morning glories, 15 seeds of hybrid corn and 10 seeds of cucumber and cotton. The seeds were covered with a uniform depth of soil and the chemicals were applied by the drench method.

The compounds were prepared as 25% wettable powders which were suspended in 250 ml. of water. The said aqueous suspensions were used to drench the flats at a dosage of ten pounds per acre. The flats were then covered for 3 or 4 days to prevent drying. After first emergence the flats were uniformly watered for 3 days. Two weeks after emergence had occurred, the phytotoxicity rating was taken and is summarized in Table VII.

TABLE VII

| | Beet | Tomato | Radish | Johnson grass | Oat | Wheat | Cotton | Hybrid corn | Milo | Cucumbers | Morning Glory | Turnips |
|---|---|---|---|---|---|---|---|---|---|---|---|---|
| 2-bromo-4′-cyanobenzanilide | 10 | 10 | 10 | 0 | 0 | 0 | | 0 | 0 | 10 | 9 | 10 |
| 2-bromo-2′,4′-dichlorobenzanilide | ¹8 | ¹8 | ²4.5 | 0 | 0 | 0 | 0 | | | | | |

¹ Stunted.  ² Chlorosis.

EXAMPLE VIII

To demonstrate the synergistic herbicidal activity of the compositions of the invention containing an oxidizing ion, rows of cotton contaminated with weeds were sprayed with the following mixtures at a dosage rate of about 0.2 pound of the active ingredient(s) per acre. Six weeks after the spray application, the phytotoxicity ratings were taken as summarized in Table VIII.

3′-chlorobenzanilide was prepared at a concentration of 10% in a solvent consisting of 50% by volume of Velsicol AR 50, 40% by volume of butyl Carbitol acetate and 10% by volume of Triton X–161. Monosodium methanearsonate was prepared at a concentration of 10% in water. The said concentrates were mixed with an appropriate amount of water and the resulting solution were sprayed on the rows under a uniform pressure.

TABLE VIII

| Compositions | Grass | Cotton | Pigweed | Vines | Cocklebur |
|---|---|---|---|---|---|
| 3′-chlorobenzanilide | 3 | 0 | 1-I | 1-I | 1-I |
| Monosodium methanearsonate | 3 | 5 | 2 | 1 | 2 |
| 3′-chlorobenzanilide plus monosodium methanearsonate | 10 | 0 | 10 | 9.5 | 10 |

I=Inhibitory.

The 3′-chlorobenzanilide composition had an initial phytotoxicity rating of about 8 on Johnson grass as it killed all the Johnson grass above ground at the time of application and the low reading in the table is due to new growth from seedlings and rhizomes. There was little phytotoxic effect on the other weeds, however. The monosodium methanearsonate composition was only weakly active on Johnson grass and the other weeds at this dosage level but caused moderate injury to the cotton.

In contrast to this, the composition of 3′-chlorobenzanilide and monosodium methanearsonate gave 95 to 100% control of all the weeds, both grasses and broadleaf and the said phytotoxicity ratings lasted until the cotton reached maturity. This composition prevented regrowth of Johnson grass from seedlings and rhizomes and gave complete control of cocklebur which has not been heretofore controllable in cotton fields by chemical means.

EXAMPLE IX

To further demonstrate the unique synergistic post-emergence and pre-emergence herbicidal activity of the compositions of the invention, 3′-chlorobenzanilide alone, monosodium methanearsonate alone and mixtures of the two components were compared.

3. The compositions of claim 1 wherein the benzanilide is 3'-chlorobenzanilide.

4. The compositions of claim 1 wherein the benzanilide is 2-bromo-3'-chlorobenzanilide.

5. The compositions of claim 1 wherein the benzanilide is 2'-chloro-5'-methylbenzanilide.

6. The compositions of claim 1 wherein the benzanilide is 2'-chloro-6'-methylbenzanilide.

7. The compositions of claim 1 wherein the benzanilide is 2-bromo-2',6'-dichlorobenzanilide.

8. The compositions of claim 1 wherein the benzanilide is 2',3,4,6'-tetrachlorobenzanilide.

9. The compositions of claim 1 wherein the benzanilide is 3',4'-dichlorobenzanilide.

10. The composition of claim 1 wherein the composition contains a herbicide from the group consisting of 1,1'-ethylene-2,2'-dipyridylium dibromide and 1,1'-dimethyl-4,4'-dipyridylium di(methylsulfate).

11. The composition of claim 1 wherein the herbicide with the oxidizing ion is monosodium methanearsonate.

12. Post-emergence herbicidal compositions for the control of grasses and broad leaf weeds in cotton fields comprising a herbicidally effective amount of a mixture of (A) at least one benzanilide of the formula

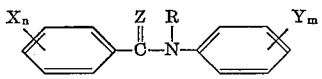

wherein X is selected from the group consisting of halogen, lower alkyl, lower alkoxy, carbo-lower-alkoxy, amino, cyano, arsono, acetyl and nitro, Y is selected from the group consisting of halogen, cyano, nitro, arsono, carbo-lower-alkoxy and lower alkyl, Z is selected from the group consisting of oxygen and sulfur, R is selected from the group consisting of hydrogen and lower alkyl, and m and n are integers from 0 to 3 except that when X and Y are only halogen, m and n are integers from 0 to 5, (B) an alkylated naphthalene and (C) a compound selected from the group consisting of lower alkyl acetates, diethylene glycol monobutyl ether acetate, 4-methyl-4-methoxypentan-2-one, 4-methyl-4-methoxypentan-2-ol, propylene glycol and isophorone and (D) a herbicidal compound selected from the group consisting of mono-lower alkane arsonic acids, di-lower alkylarsinic acids and their alkali metal, alkaline earth metal and amine salts, the ratio of A to D being from 5:2 to 3:5.

13. The compositions of claim 12 wherein the arsenical compound is selected from the group consisting of methanearsonic acid and its salts.

14. The compositions of claim 12 wherein the arsenical compound is monosodium methanearsonate.

15. A post-emergence herbicidal composition for the control of grasses and broad leaf weeds in cotton fields comprising 3'-chlorobenzanilide, monosodium arsenate, a surfactant, alkylated naphthalenes and at least one compound selected from the group consisting of lower alkyl acetates, diethylene glycol monobutyl ether acetate, 4-methyl-4-methoxypentan-2-one, 4-methyl-4-methoxypentan-2-ol, propylene glycol and isophorone.

16. A method of killing grasses and broad leaf weeds in cotton fields which comprises spraying the fields with a herbicidally effective amount of a composition for the control of grasses and broad leaf weeds in cotton fields comprising a composition of claim 12.

17. The method of claim 16 wherein the arsenical compound is selected from the group consisting of methane arsonic acid and its salts.

18. The method of claim 16 wherein the arsenical is monosodium methanearsonate.

19. A method of killing weeds which comprises contacting the weeds with a herbicidally effective amount of a composition comprised of (A) at least one benzanilide of the formula

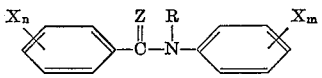

wherein X is selected from the group consisting of halogen, lower alkyl, lower alkoxy, carbo-lower-alkoxy, amino, cyano, arsono, acetyl and nitro, Y is selected from the group consisting of halogen, cyano, nitro, arsono, carbo-lower-alkoxy and lower alkyl, Z is selected from the group consisting of oxygen and sulfur, R is selected from the group consisting of hydrogen and lower alkyl, and m and n are integers from 0 to 3 except when X and Y are only halogen, m and n are integers from 0 to 5, (B) an aromatic hydrocarbon and (C) an oxygenated organic solvent and (D) a synergistic amount of a herbicide with an oxidizing ion selected from the group consisting of mono-lower alkane arsonic acids, di-lower alkylarsinic acids and their alkali metal, alkaline earth metal and amine salts, 1,1'-diethylene-2,2'-dipyridylium dibromide and 1,1'-dimethyl-4,4'-dipyridylium di(methyl sulfate).

20. The method of claim 19 wherein the benzanilide is 3',4'-dichlorobenzanilide.

21. The method of claim 19 wherein the benzanilide is 2-bromo-3',4'-dichlorobenzanilide.

22. The method of claim 19 wherein the benzanilide is 3'-chlorobenzanilide.

23. The method of claim 19 wherein the benzanilide is 2-bromo-3'-chlorobenzanilide.

24. The method of claim 19 wherein the benzanilide is 3',4'-dichloro-4-nitrobenzanilide.

25. The method of claim 19 wherein the composition contains a surfactant.

26. A method of controlling grasses and broad leaf weeds in cotton fields for an entire growing season which comprises spraying the cotton field once with a herbicidally effective amount of a post-emergence herbicidal composition for the control of grasses and broad leaf weeds in cotton fields comprising 3'-chlorobenzanilide, monosodium arsenate, a surfactant, alkylated naphthalenes and at least one compound selected from the group consisting of lower alkyl acetates, diethylene glycol monobutyl ether acetate, 4-methyl-4-methoxypentan-2-one, 4-methyl-4-methoxypentan-2-ol, propylene glycol and isophorone.

References Cited

UNITED STATES PATENTS 2,678,265  5/1954  Schwerdle _____ 71—2.7
2,965,575  12/1960  Beaver _____ 260—588 X

OTHER REFERENCES

Pizey et al., J. Sci. Food Agric., 10, November 1959, pages 576 to 584, page 578, particularly 71–2.6 pertinent.

Chemical Abstracts, Soloway et al., vol. 47, p. 573e (1953).

Chemical Abstracts, Tarbell et al., vol. 47, p. 6383c (1953).

Chemical Abstracts, Bartley et al., vol. 49, p. 954d.

Chemical Abstracts, Suthers, vol. 57, p. 704d (1962).

Chemical Abstract, Good, vol. 56, pp. 7714–7715 (1962).

Thompson et al., Botanical Gazette, vol. 107 (1946), pages 475–507, particularly pp. 476 to 483, 493, 496, 497.

Weed Control Handbook, edited by Woodford, second edition (1960), pages 4, 17, 18, 155, 161–Sb.

LEWIS GOTTS, Primary Examiner.

ELBERT L. ROBERTS, JAMES O. THOMAS, JR.,
                                                  Examiners.

A. J. ADAMCIK, Assistant Examiner.